(12) United States Patent
Teller et al.

(10) Patent No.: US 8,988,253 B2
(45) Date of Patent: Mar. 24, 2015

(54) RECOVERY OF BALLOON MATERIALS

(75) Inventors: Eric Teller, Mountain View, CA (US);
Richard Wayne DeVaul, Mountain View, CA (US); Joshua Weaver, Mountain View, CA (US); Clifford L. Biffle, Mountain View, CA (US); Bradley James Rhodes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 366 days.

(21) Appl. No.: 13/550,160

(22) Filed: Jul. 16, 2012

(65) Prior Publication Data
US 2014/0015694 A1 Jan. 16, 2014

(51) Int. Cl.
*G08B 21/00* (2006.01)
*B64B 1/40* (2006.01)

(52) U.S. Cl.
CPC ........................................ *B64B 1/40* (2013.01)
USPC .......................................... 340/946; 455/12.1

(58) Field of Classification Search
USPC ................... 340/946; 455/12.4, 431; 342/461
See application file for complete search history.

(56) References Cited

U.S. PATENT DOCUMENTS

| 4,754,283 A | 6/1988 | Fowler |
| 5,420,592 A | 5/1995 | Johnson |
| 6,628,941 B2 | 9/2003 | Knoblach et al. |
| 7,356,390 B2 | 4/2008 | Knoblach et al. |
| 7,801,522 B2 | 9/2010 | Knoblach et al. |
| 7,912,422 B2 | 3/2011 | Rocken et al. |
| 2002/0116266 A1 | 8/2002 | Marshall |
| 2006/0003698 A1 | 1/2006 | Seligsohn et al. |
| 2007/0112705 A1 | 5/2007 | Mardirossian |
| 2008/0299990 A1* | 12/2008 | Knoblach et al. .......... 455/456.1 |

FOREIGN PATENT DOCUMENTS

JP 2000-177695 A 6/2000

OTHER PUBLICATIONS

Mullenix, Dave, Edge of Space Sciences, "Ham Ballooning FAQ or What little I know about ham ballooning", http://www.eoss.org/pubs/faqloon.htm, p. 1-10.
Niss, Sarah, "Weather balloon retrieved after GPS signal lost", The Daily Tar Heel, http://www.dailytarheel.com/index.php/article/2012/01/weather_balloon_retrieved_after_signal_lost, The Daily Tar Heel, Jan. 23, 2012, p. 1-2.
PCT/US2013/050271, International Search Report, Nov. 27, 2013.

* cited by examiner

*Primary Examiner* — Shirley Lu
(74) *Attorney, Agent, or Firm* — McDonnell Boehnen Hulbert & Berghoff LLP

(57) ABSTRACT

Methods and systems involving an incentivized recovery of balloon materials are disclosed herein. An example system may be configured to: (a) determine a landing location of a balloon, where the balloon has been configured to operate as a node in a balloon network; (b) detect a removal event corresponding to the balloon ceasing to operate as a node in the balloon network and descending to the landing location; and (c) in response to detecting the removal event, initiate a transmission of a recovery-assistance signal that is comprised of (i) location data corresponding to the landing location of the balloon and (ii) an indication of an incentive to recover the balloon.

25 Claims, 5 Drawing Sheets

RECOVERY OF BALLOON MATERIALS

BACKGROUND

Unless otherwise indicated herein, the materials described in this section are not prior art to the claims in this application and are not admitted to be prior art by inclusion in this section.

High-altitude balloons positioned in the stratosphere that are capable of operating as nodes in a data network are increasingly being used across areas of the world. These high-altitude balloons may, from time to time, lose their ability to remain positioned in the stratosphere and/or require repair. Thus, for these and other reasons, the balloons may exit the stratosphere and come to rest, possibly at ground level. Accordingly, a system for recovering balloons that have exited the stratosphere is desirable.

SUMMARY

In a first aspect, a system is provided. The system may include: (1) a location-determination system for determining the location of a balloon, wherein the location-determination system is configured to determine a landing location of the balloon, and wherein the balloon is configured to operate as a node in a balloon network; and (2) a control system configured to: (a) detect a removal event corresponding to the balloon ceasing to operate as a node in the balloon network and the balloon descending to the landing location; and (b) in response to detecting the removal event, initiate transmission of a recovery-assistance signal, wherein the recovery-assistance signal comprises: (i) location data corresponding to the landing location of the balloon, and (ii) an indication of an incentive to recover the balloon.

In a further aspect, a computer-implemented method is provided. The computer-implemented method may include instructions for: (1) determining a landing location of a balloon, wherein the balloon is configured to operate as a node in a balloon network; (2) detecting a removal event of the balloon, wherein the removal event corresponds to the balloon ceasing to operate as a node in the balloon network and the balloon descending to the landing location; and (3) initiating, in response to detecting the removal event, a transmission of a recovery-assistance signal, wherein the recovery-assistance signal comprises: (i) location data corresponding to the landing location of the balloon, and (ii) an indication of an incentive to recover the balloon.

In yet a further aspect, a non-transitory computer readable medium having stored therein instruction executable by a computing device to cause the computing device to perform functions is disclose. The functions include: (1) determining a landing location of a balloon, wherein the balloon is configured to operate as a node in a balloon network; (2) detecting a removal event of the balloon, wherein the removal event corresponds to the balloon ceasing to operate as a node in the balloon network and the balloon descending to the landing location; and (3) initiating, in response to detecting the removal event, a transmission of a recovery-assistance signal, wherein the recovery-assistance signal comprises: (i) location data corresponding to the landing location of the balloon, and (ii) an indication of an incentive to recover the balloon.

These as well as other aspects, advantages, and alternatives, will become apparent to those of ordinary skill in the art by reading the following detailed description, with reference where appropriate to the accompanying drawings.

DETAILED DESCRIPTION

Figure 1:
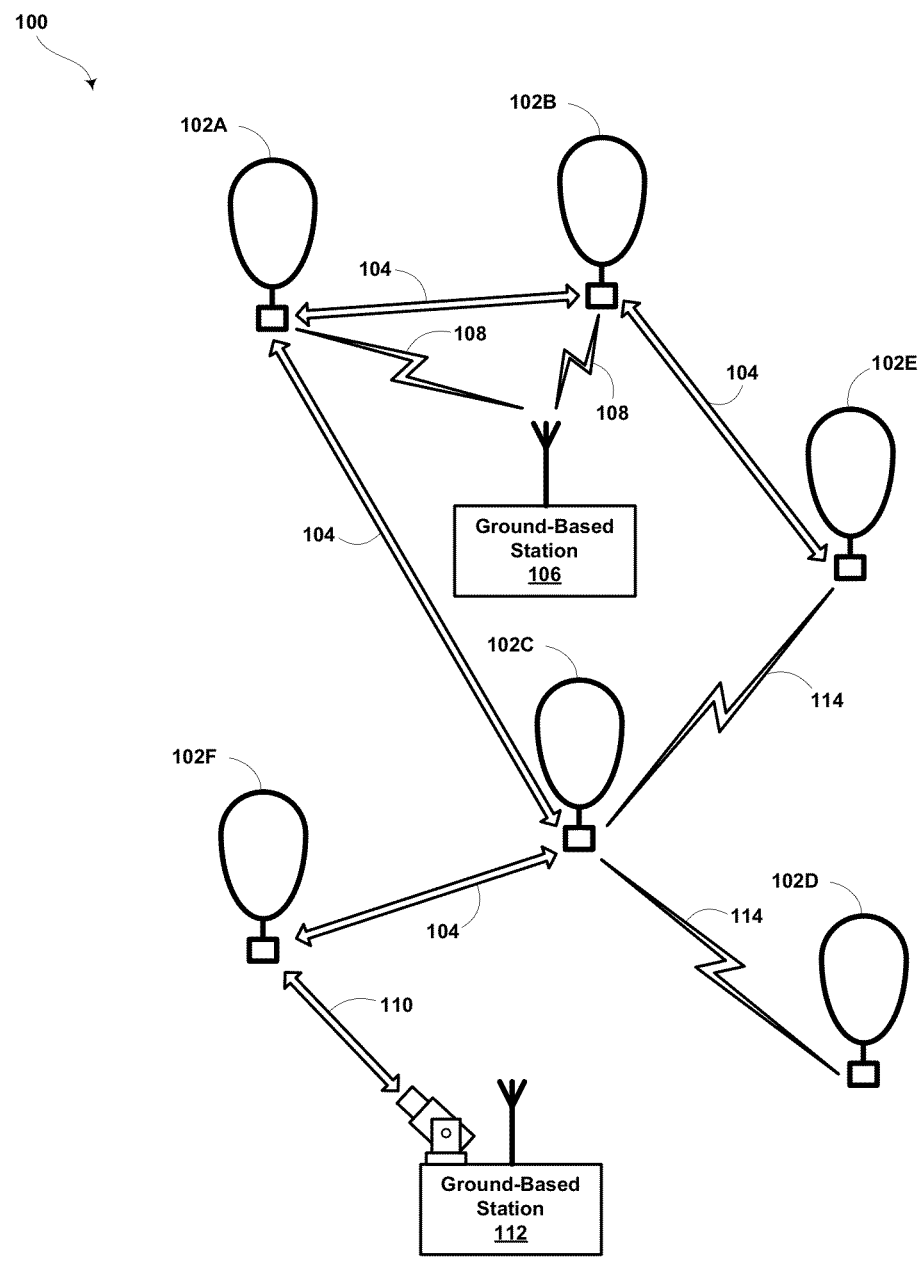
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures or otherwise described herein should not be viewed as necessarily limiting. It should be understood that other embodiments may include more or less of each element shown in a given Figure. Further, some of the illustrated elements may be combined or omitted. Yet further, an example embodiment may include elements that are not illustrated in the Figures.

1. Overview

The systems and methods described herein may help provide for more convenient and/or efficient techniques for the recovery of balloon materials. For example, the techniques described herein may incentivize an individual to aid in collecting, recycling, and/or cleaning up balloon materials that have ceased operating as a node in a balloon network and have descended from the stratosphere. More specifically, example embodiments may help to provide a means for recovering balloon materials that previously operated as a node in balloon network formed by high-altitude balloons deployed in the stratosphere. Since the balloons may need to be grounded, or may descend to the ground on their own accord, an incentive system is disclosed to aid in the recovery of the fallen balloons.

A balloon that is operating as a node in a balloon network may, at some point, either require grounding or begin to descend from the stratosphere on its own. For instance, instructions may be provided for the balloon to descend, and the balloon may responsively descend. Alternatively, the balloon may begin descending as a result of mechanical, electrical, or software failure. In any event, the instruction to descend, or descent itself, may terminate the ability for the balloon to operate as a node that transports data through the balloon network. Alternatively, the balloon may intentionally cease to operate as a node as it begins to descend, but before it is no longer possible to operate as a node.

The balloon ceasing to operate as a node may involve the balloon ceasing to perform certain mesh network functions, such as the routing, receipt, and/or transmission of data on behalf, from, or to other nodes in the network. However, it should be understood that, as described herein, when the balloon ceases to operate as a node, communication between the balloon and the network may still exist. That is, despite the balloon ceasing to operate as a node in the balloon network with full mesh-network routing capabilities, the balloon may still communicate with the network on its own behalf, including communicating with other balloons operating as nodes in the balloon network. Communication between the balloon and the network, however, is not required for the landing location to be determined. For example, the balloon's landing location can be predicted based on its last known position and other factors, such as predictions for prevailing winds and topography.

A control system may detect a "removal event" corresponding to the balloon ceasing to operate as a node and to the balloon preparing to begin its descent, descending, or having completed its descent. The detection of such a removal event may trigger the balloon to transmit a recovery-assistance signal, which may be transmitted, for example, to balloons remaining in the balloon network or to ground-based station(s). The recovery-assistance signal may be communicated with balloons remaining in the balloon network or with the ground-based stations via free-space optical communications or radio-frequency (RF) communications. Additionally, the recovery-assistance signal may also be detectable locally, such as through the use of a light or audible sound.

The recovery-assistance signal may comprise location data and an indication of an incentive to recover the balloon materials. The incentives may be, for example, a physical item or an indication of a reward. Additionally, the recovery-assistance signal may comprise information regarding the expected or actual landing location of the balloon. The recovery-assistance signal may be received by individuals with the ability to, and potential interest in, recovering the balloon materials. As a result of including a reward on the balloons, one may be incentivized to search for the fallen balloons and possibly recycle the materials, reuse the materials, or send the materials back to the manufacturer. Also, knowledge of an incentive attached to a balloon may be transmitted through advertising means, such as on a billboard or website. Thus, individuals may be incentivized to clean up the balloon materials.

It should be understood that the examples discussed above are provided for purposes of example and explanation only and should not be taken to be limiting.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations may be modeled in a reasonably accurate manner. Additionally, altitudes above 18 km are typically above the maximum flight level designated for commercial air traffic. Therefore, interference with commercial flights is of decreased concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network may also include multiple downlink balloons. On the other hand, a balloon network may also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

a. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon mesh network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

b. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

In an example embodiment, station-keeping functionality may involve balloons moving relative to the ground such that a desired population and/or general spacing may be maintained in a given area, even as the particular balloons that serve the area change. For example, balloons may move out of an area, while other balloons move into the same area. Accordingly, station-keeping functionality may focus on maintaining a desired topology, without necessarily requiring that certain balloons stay at certain locations.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

c. Control of Balloons in a Balloon Network

Figure 2:
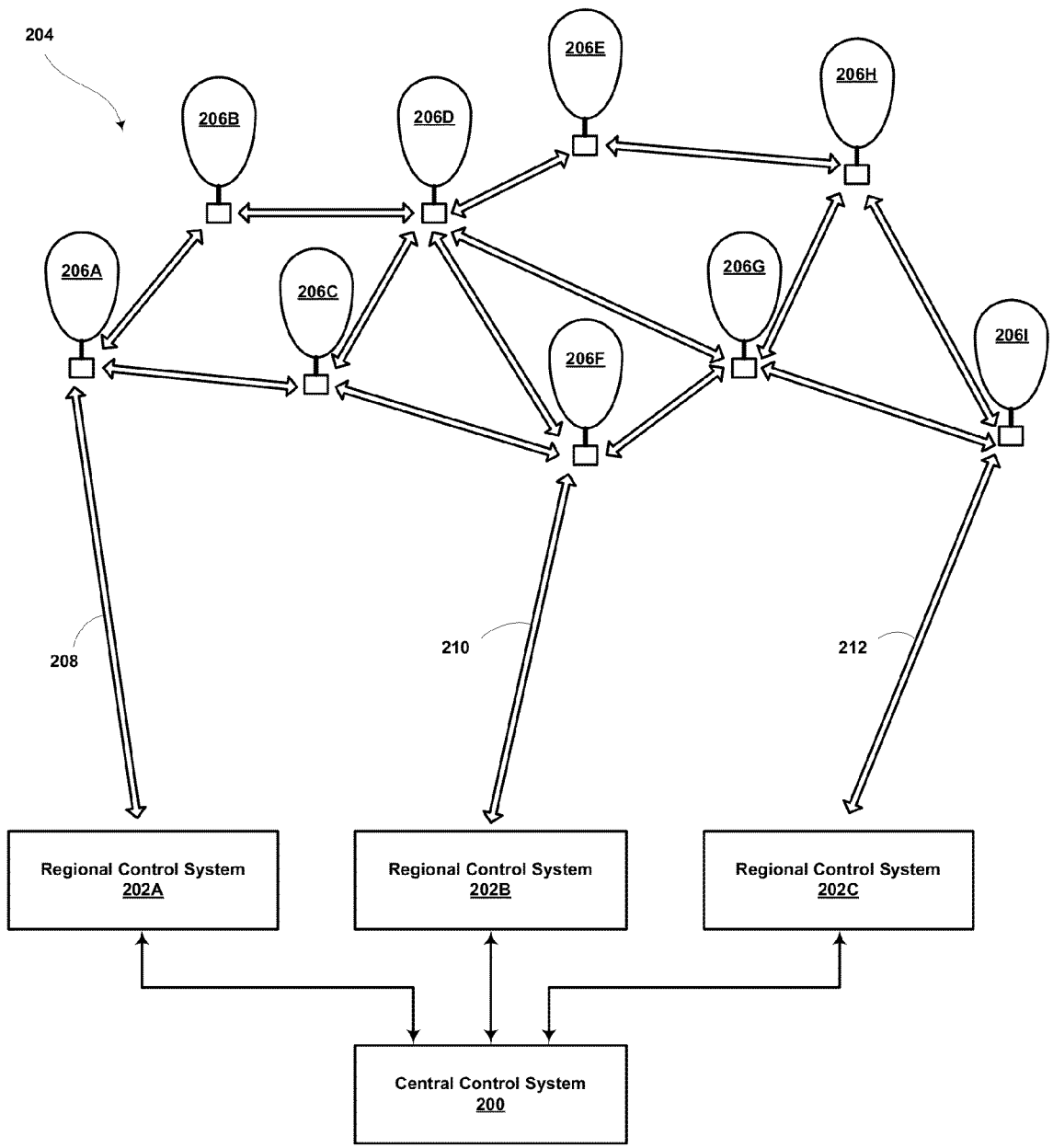
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, wherein $d_i$ is proportional to the distance to the second nearest neighbor balloon, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

d. Example Balloon Configuration

Figure 3:
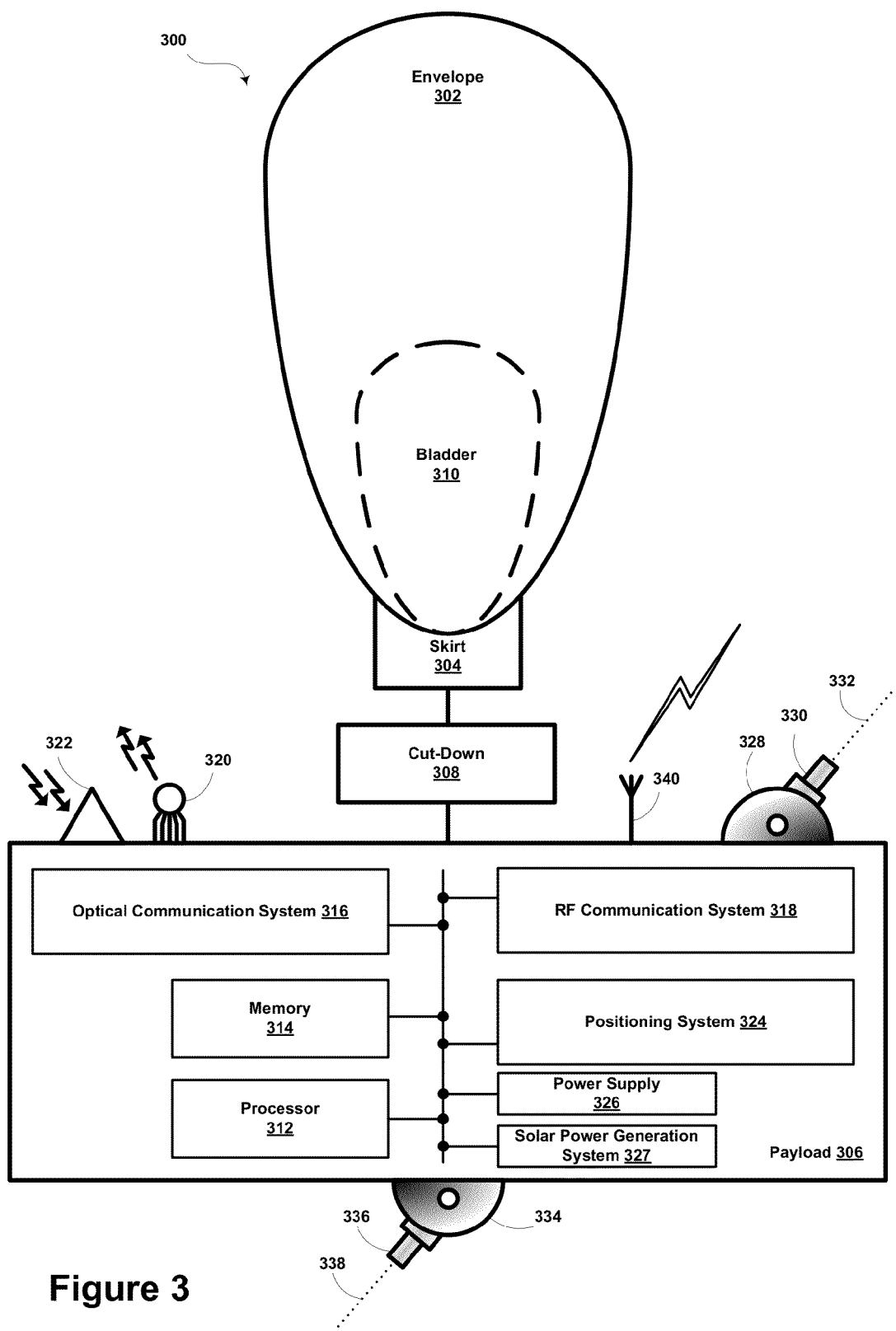
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km (the high-altitude balloons may operate in other altitude ranges as well). FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which may be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

Additionally, a balloon 300 may include a location-determination system (not shown) for determining the location of a balloon. The location determination system may be configured to determine the landing location of a balloon that has been configured to operate as a node in a balloon network.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

Further, the balloon 300 may include a control system, which may correspond to a processor 312. The control system may be configured to detect a removal event corresponding to a balloon ceasing to operate as a node in the balloon network and the balloon descending to the landing location, as further discussed below. Additionally, in response to detecting the removal event, the control system may be configured to initiate transmission of a recovery-assistance signal, where the recovery-assistance signal comprises the location data corresponding to the landing location of the balloon and an indication of an incentive to recover the balloon. The control system is further discussed below.

e. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
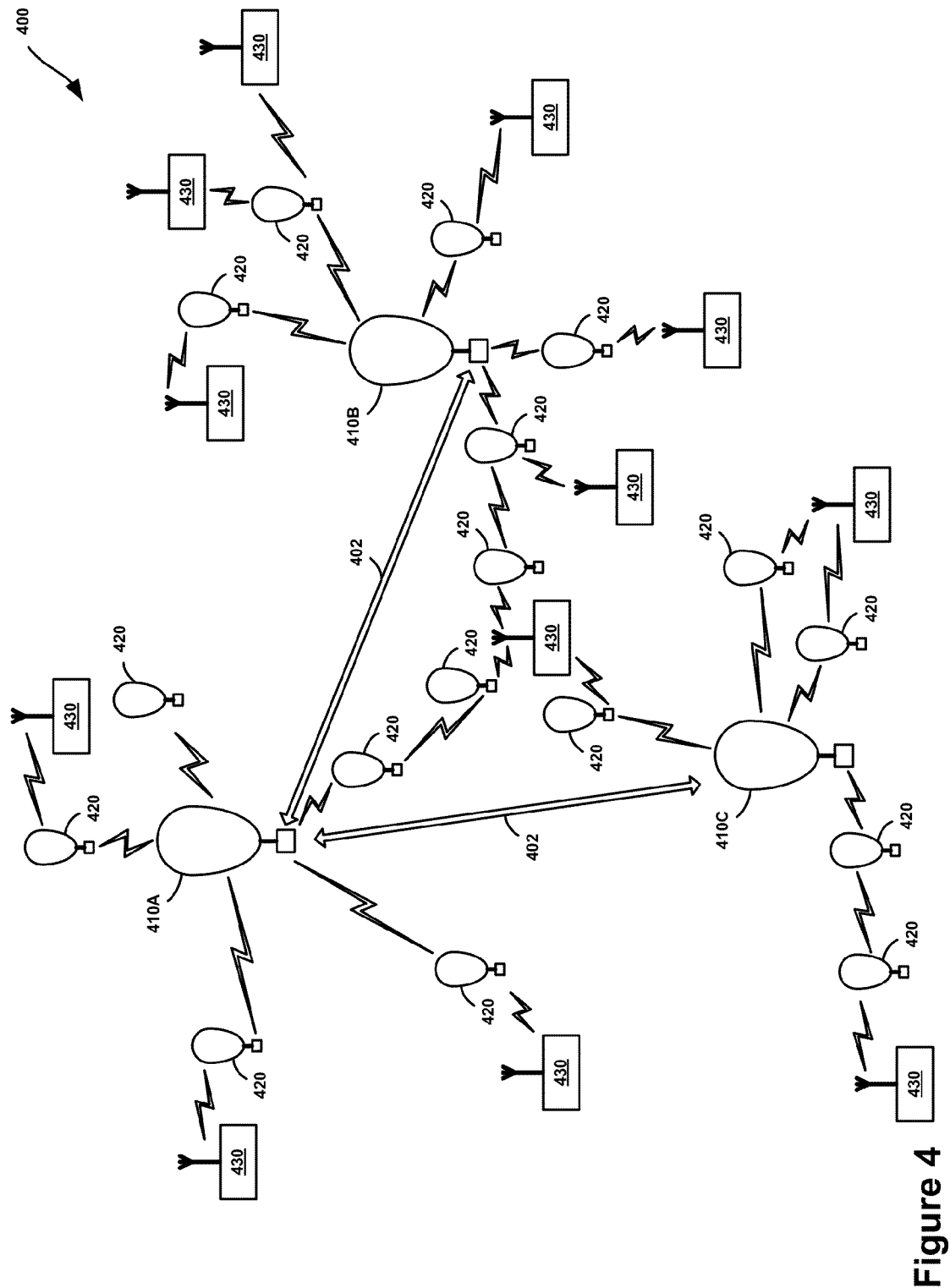
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 MBit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

3. Example Techniques for Incentivized Recovery of Balloon Materials

Figure 5:
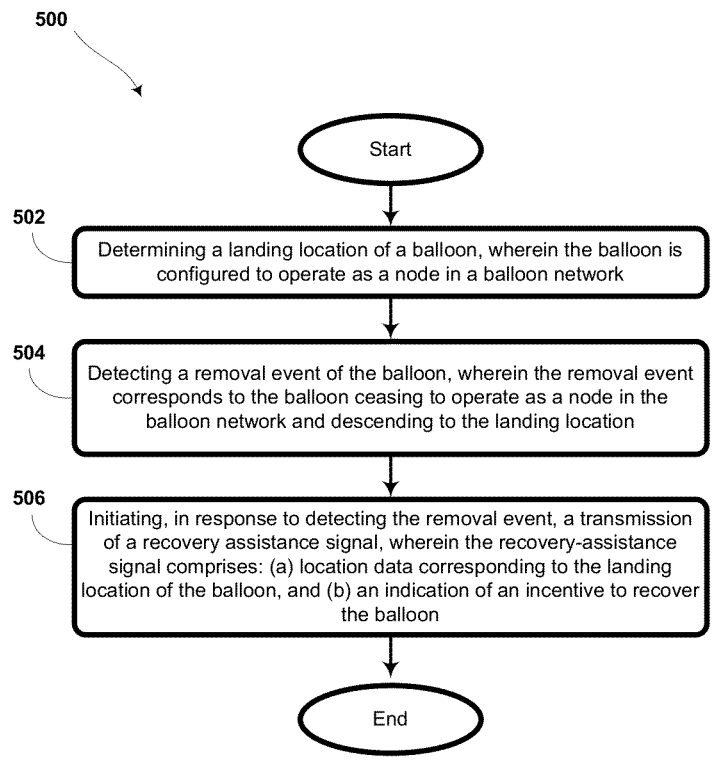
FIG. 5 is a flowchart illustrating a method, according to an example embodiment.

FIG. 5 is a flowchart illustrating an example method 500 for cleaning up balloon materials in return for an incentive. This method may be carried out by a location-determination system that determines the location of a balloon, and/or a control system configured to detect a removal event and transmit a recovery-assistance signal. The location-determination system and the control system may be a single system, and may be combined or distributed. For instance, method 500 may be performed using any of the apparatuses, or combinations thereof, shown in FIGS. 1-4 and described above. However, other configurations may be used as well. Further, the blocks shown in FIG. 5 for method 500 are for one particular embodiment. In other embodiments, the blocks may appear in different order, and blocks may be added or subtracted.

Example method 500 begins at block 502 with the control system determining a landing location of a balloon, where the balloon is configured to operate as a node in a balloon network. At block 504, the control system detects a removal event of the balloon, where the removal event corresponds to the balloon ceasing to operate as a node in the balloon network and the balloon descending to the landing location. At block 506, the control system initiates, in response to detecting the removal event, a transmission of a recovery-assistance signal. In one embodiment, the recovery-assistance signal comprises location data corresponding to the landing location of the balloon, in addition to an indication of an incentive to recover the balloon.

a. Determining a Landing Location

Block 502 involves determining a landing location of a balloon where the balloon is configured to operate as a node in a balloon network. Block 502 may be carried out by a location-determination system. For purposes of illustration, this example assumes that the balloon network is in a high-altitude network of balloons that functions as a mesh network to transport data. However, other types of balloon networks are possible.

The balloon may be configured as shown in FIG. 3, or it may be differently configured. The landing location of the balloon may be determined using GPS, inertial navigation data, star-tracking, radar, or by some other method. The location of the balloon may be determined by a positioning system within the balloon, such as positioning system 324 shown in FIG. 3. Alternatively, the landing location of the balloon may be determined externally, for example, by another balloon operating as a node in the balloon network, a ground-based station, or by some other entity.

In one embodiment, the determined landing location may be an exact landing location. An exact landing location may signify that the balloon has come to rest and the exact location of the balloon is determinable. A balloon may determine it is at rest when the positioning system 324 no longer senses movement of the balloon, either vertically or horizontally. Additionally, a balloon may sense when the impact of landing has occurred.

In another embodiment, the landing location may be an expected landing location. An expected landing location, however, may signify that the balloon is still airborne. An expected landing location may be determined at any point while the balloon is airborne. For example, an expected landing location may be determined once the balloon descends to a predetermined threshold altitude or when the expected landing location may be determined to within a predetermined confidence interval.

The expected landing location of the balloon may be determined by analyzing the wind speed and direction in the surrounding environment, and additional environmental conditions such as pressure, altitude, temperature, and relative humidity. Additionally, other factors such as predictions for prevailing winds and topography may assist in determining the final landing location. When a balloon falls, these environmental conditions may affect the route the balloon falls to the ground. Measuring the environmental conditions may allow the balloon to predict the landing location. Thus, the balloon may determine its current location while airborne and calculate the expected landing location based on the direction and speed of the wind.

Further, the balloon may also use the navigation system discussed above to determine its position or move to a predetermined position. In this sense, the balloon may navigate and control its descent to a predetermined designated location. For example, the balloon may actively control the descent and steer to a particular landing location.

In another embodiment, other balloons that remain in the balloon network may determine the landing location of the fallen balloon. For example, a plurality of balloons in the balloon network may form a coordinate system to determine the direction the falling balloon is traveling or the final location of the falling balloon.

b. Detecting a Removal Event

Block 504 involves detecting a removal event corresponding to the balloon ceasing to operate as a node in the balloon network and the balloon descending to a landing location. The removal event may be detected by an independent detection device or by the balloon itself. Further, the detection may occur either for a scheduled removal event or when the removal event has already occurred. For example, detection may occur when the balloon receives instructions for the balloon to cease functioning as a node in the balloon network, or when the balloon ceases to act as a node in the balloon network based on its own malfunction.

A removal event may occur anytime and for various reasons. For example, a balloon may need repair and thus may receive instructions to cease operating as a node in the balloon network and descend to the ground. In another example, a balloon may experience mechanical, electrical, or software failure, causing the balloon to cease operating as a node in the balloon network and descend to the ground.

In one embodiment, the removal event may be a cut-down action or an anticipated cut-down action. The cut-down action may be performed by a cut-down system 308, as described above. The cut-down system acts to separate the payload 306 from the rest of the balloon 300, causing the balloon to descend to a landing location.

A cut-down action may result in the payload being separated from the rest of the balloon 300. An anticipated cut-down action, however, occurs when the balloon 300 receives a signal to separate the payload 306 from the rest of the balloon 300, but the separation has not yet occurred. The anticipated cut-down action may include instructions for the balloon to cease operating as a node in the network and plan to descend, thus corresponding to a removal event. In another embodiment, the balloon itself may cease to operate as a node in the balloon network and independently descend or plan to descend without the receipt of instructions. This may occur when there is a malfunction in the balloon.

Thus, the removal event may be an actual removal or an anticipated removal. Actual removal may occur, for example, when the cut-down event is completed, such that the balloon and payload have separated, the balloon no longer functions as a node, and the descent begins. Anticipated removal may occur, for example, when the balloon has indicated it will cease operating as a node in the balloon network, and is planning to descend or just beginning to descend.

More specifically, the removal event may occur as an anticipated cut-down action, where the cut-down system 308 receives instructions to perform the cut-down action. Instructions for the cut-down action may be delivered from neighboring balloons in the balloon network, a ground-based system 106, 112, or a central control system 200 as shown in FIGS. 1 and 2. Upon receipt of an instructional signal, the cut-down system 308 may release the payload 306 from the balloon 300 as described above, allowing the balloon to descend to its landing location and cease to operate as a node in the balloon network.

Additionally, the removal event may occur when the variable buoyancy system, which includes a bladder, changes the altitude of the balloon such that it is descending to the ground and the balloon ceases to operate as a node in the balloon network.

In another embodiment, the removal event may occur when a balloon initiates a controlled descent from the stratosphere to a lower altitude, where it remains airborne. Thus, the balloon may then be retrieved while still airborne by a recovery vehicle. The recovery vehicle may be manned or remotely piloted. Alternatively, the recovery vehicle may operate autonomously.

As noted above, the balloon network may generally include a plurality of nodes that are configured to transport data through the balloon network, where at least some other nodes in the balloon network are balloons as well. The balloon may be any balloon that is being used to transport data as a node in a balloon network. When the balloon functions as a node, it may generally operate as a connection point and is capable of sending, receiving, or forwarding information of a communication channel, such as the mesh network described above. Thus, when a balloon ceases to operate as a node in the balloon network, it may no longer be capable of sending, receiving, or forwarding information relating to the communication channel. The ability to maintain communication with balloons that still function as nodes in the balloon network, however, may remain.

Thus, a balloon may no longer be available to transport data through the balloon network when the balloon ceases to operate as a node in the balloon network. In other words, the balloon may no longer operate as a connection point for the network, and may not send, receive, or forward network information. The balloon may, however, still communicate with at least one of the other balloons remaining in the balloon network. More specifically, the balloon may be configured to communicate with at least one other balloon in the balloon network after ceasing operation as a node in the balloon network, where the other balloon is operating as a node in the balloon network. This communication may be in the form of free-space optical communications or radio-frequency communications. This communication may be used to provide the recovery-assistance signal to the balloons that remain functioning as nodes in the balloon network.

c. Initiating a Transmission of a Recovery-Assistance Signal

Block 506 involves initiating a transmission of a recovery-assistance signal following the detection of the removal event. The recovery-assistance signal may include location data corresponding to the landing location of the balloon as well as an indication of an incentive to recover the balloon.

There are several means by which a balloon may transmit the recovery-assistance signal. For example, the transmission of a recovery-assistance signal following the detection of the removal event may occur between the balloons via RF links 114. Recall that the communication between the balloons may still be possible despite the removed balloon ceasing to operate as a node in the balloon network. In another embodiment, the balloons may be configured to communicate the recovery-assistance signal to ground-based stations 106 and 112 via respective RF links 108. In yet another embodiment, a transmission signal may be sent to other balloons in the balloon network 100 via free-space optical links 104. Additionally, the recovery-assistance signal may be a local signal. Some examples of a local signal include an LED light that lights up or audible sound that is emitted, among others. As an example, the light or audible sound may be constant or fluctuating, such as a beeping sound or a flashing light.

In one embodiment, the control system may be further configured to transmit the recovery-assistance signal in response to a determination that the balloon has landed. The recovery-assistance signal may be transmitted to either one or more of the balloons remaining in the balloon network 100, to a ground-based station 106, 112, or as a local signal, in response to the determination that the balloon has landed. Similarly, the recovery-assistance signal may be transmitted when an initial cut-down signal is received. In this instance, the balloon's geographical position while still in the stratosphere may first be obtained and used in the determination of the expected landing location.

In another example embodiment, the control system may be further configured to determine the expected landing location in response to the removal event and transmit the recovery-assistance signal before the balloon has descended to the landing location. For example, the control system may be further configured to transmit the recovery-assistance signal in response to a determination that the balloon has descended below a predetermined altitude. This embodiment allows for advanced notice of the descending balloon to help the search for its final landing location. In another embodiment, the control system may be further configured to transmit the recovery-assistance signal in response to a determination that the expected landing location be determined to within a predetermined confidence interval. Thus, the recovery-assistance signal may be transmitted to either one or more of the balloons remaining in the balloon network 100 or to a ground-based station 106, 112 before the balloon has reached the landing location.

The location data transmitted by the balloon may come in various forms. In one embodiment, location data may be in the form of a pair of longitudinal and latitudinal coordinates. In another embodiment, the location data also might convey the time of landing or altitude of the balloon. The location data may also include the wind velocity analysis, and other information relating to the environmental conditions that the balloon may use to determine the exact landing location. The location data may include other information as well.

Block 506 also includes the transmission of a recovery-assistance signal that indicates the presence of an incentive to recover the balloon. The indication of the incentive can take the form of a signal indicating the location of the incentive in addition to the type of incentive that is attached to or associated with the balloon. A user, upon receipt of the signal, may then have knowledge of what he or she might receive upon finding the balloon, which acts as an incentive for balloon recovery. Additionally, one may receive knowledge than an incentive is attached to a balloon through advertising means, such as through a website, billboard advertisement, or television commercial. Thus, the transmission of the recovery-assistance signal may prompt an individual to recognize that an incentive is available upon the recovery of the balloon.

A variety of examples of incentives exist. In one embodiment, the incentive to recover the balloon further comprises a receipt of a physical item. For example, a handheld electrical device may be attached to the balloon or included in the payload 306. Examples of handheld electrical devices include cell phones, cameras, tablets, and mp3 players, among other examples. In another embodiment, a gift certificate, such as a gift certificate for cell phone minutes, may be attached or included in the payload 306. Thus, a user is incentivized to find the fallen balloon in exchange for the physical item. Other examples of physical items may exist as well.

In yet another embodiment, the incentive to recover the balloon may comprise an indication of a reward. For example, an indication of a reward may be a coupon with a coupon code. Thus, upon finding a balloon, a user may receive a coupon code and directions for redemption. Once redemption has occurred, the user may receive the reward either electronically, through the mail, or via pick-up, among other examples. Thus, a user may be incentivized to find the fallen balloon in exchange for the indication of a reward.

In some embodiments, the incentive to recover the balloon may be contingent on the recycle of the balloon. In other words, the user that finds the balloon must recycle the balloon materials prior to receiving the reward. Once the user presents evidence that the balloon has been recycled, the reward may be claimed. In accordance with such an embodiment, the balloons may be equipped with directions for proper recycling and reuse.

Additionally, an incentive to recover the balloon may be contingent on the return of the balloon. For example, return of the balloon may be to an address specified either on the balloon or an address that is publicly available. Once the balloon is received by the specified address, the user may receive the reward.

As described above, the transmission of the recovery-assistance signal can be sent to balloons remaining in the balloon network 100 or to ground stations 106, 112. In one embodiment, the signal may be sent to a balloon recovery database. The balloon recovery database may be in the form of a website or service that allows users to track the status of the balloons. Accordingly, recovery-assistance data indicating a transmission of a recovery-assistance signal may be stored in the balloon recovery database. The database may be accessible to one or more independent balloon-recovery users. A balloon-recovery user may be anyone who seeks to find the balloons and recover them. The database may list the landing location of the fallen balloons in addition to the incentive that is attached to each balloon.

Additionally, the database may track all balloons that have fallen across the world. Updates can be provided when each balloon has been recovered. Thus, when a balloon-recovery user recovers a balloon, the database may report that the balloon has been found in order to alert other users attempting to find the balloon. This database may be available via a website or as a service that allows the users to track the status of the balloons, communicate with others, and update their findings. If multiple users are working to recover the balloons, constant up-to-date alerts may provide motivation to continue their search if the balloons still have yet to be found or begin pursuing another balloon. In one embodiment, a user may update the database using a code or registration number attached to the balloon.

In another embodiment, the transmission of the recovery-assistance signal may include transmission of a beacon signal that is detectable by one or more detecting devices. For example, nearby hikers may pick up the recovery-assistance signal through their radios. The receipt of the recovery-assistance signal, which includes the location data corresponding to the landing location and the indication of the incentive, may then incentivize the hikers and allow them to find and recover the balloon materials.

4. Non-Transitory Computer Readable Media

Some or all of the functions described above and illustrated in FIGS. 1-5 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device in a balloon, such as a computing device corresponding to processor 312 illustrated in FIG. 3. Alternatively, the computing device that executes the stored instructions could be in another entity, such as a ground-based station.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system comprising:
a location-determination system for determining the location of a balloon, wherein the location-determination system is configured to determine a landing location of the balloon, and wherein the balloon is configured to operate as a node in a balloon network; and
a control system configured to:
detect a removal event corresponding to the balloon ceasing to operate as a node in the balloon network and the balloon descending to the landing location; and
in response to detecting the removal event, initiate transmission of a recovery-assistance signal, wherein the recovery-assistance signal comprises: (a) location data corresponding to the landing location of the balloon, and (b) an indication of an incentive to recover the balloon.

2. The system of claim 1, wherein the balloon network comprises a plurality of nodes that are configured to transport data through the balloon network, wherein each node in the balloon network is a balloon.

3. The system of claim 1, wherein the removal event is a cut-down action or an anticipated cut-down action.

4. The system of claim 1, wherein the balloon is no longer available to transport data through the balloon network when the balloon ceases to operate as a node in the balloon network.

5. The system of claim 4, wherein the balloon is configured to communicate with at least one other balloon in the balloon network after ceasing to operate as a node in the balloon network, wherein the other balloon is operating as a node in the balloon network.

6. The system of claim 1, wherein the landing location is an expected landing location.

7. The system of claim 1, wherein the control system is further configured to determine the expected landing location in response to the removal event and transmit the recovery-assistance signal before the balloon has descended to the landing location.

8. The system of claim 7, wherein the control system is further configured to transmit the recovery-assistance signal in response to a determination that the expected landing location be determined to within a predetermined confidence interval.

9. The system of claim 7, wherein the control system is further configured to transmit the recovery-assistance signal in response to a determination that the balloon has descended below a predetermined altitude.

10. The system of claim 1, wherein the control system is further configured to transmit the recovery-assistance signal in response to a determination that the balloon has landed.

11. The system of claim 1, wherein an incentive to recover the balloon further comprises a receipt of a physical item.

12. The system of claim 1, wherein an incentive to recover the balloon further comprises an indication of a reward.

13. The system of claim 1, wherein an incentive to recover the balloon is contingent on the return of the balloon.

14. The system of claim 1, wherein an incentive to recover the balloon is contingent on the recycle of the balloon.

15. The system of claim 1, wherein recovery-assistance data indicating a transmission of a recovery-assistance signal is included in a balloon recovery database.

16. The system of claim 1, wherein the transmission of the recovery-assistance signal comprises transmission of a beacon signal that is detectable by one or more detecting devices.

17. A computer-implemented method comprising:
determining a landing location of a balloon, wherein the balloon is configured to operate as a node in a balloon network;
detecting a removal event of the balloon, wherein the removal event corresponds to the balloon ceasing to operate as a node in the balloon network and the balloon descending to the landing location; and initiating, in response to detecting the removal event, a transmission of a recovery-assistance signal, wherein the recovery-assistance signal comprises: (a) location data corresponding to the landing location of the balloon, and (b) an indication of an incentive to recover the balloon.

18. The method of claim 17, wherein the removal event is a cut-down action or an anticipated cut-down action.

19. The method of claim 17, wherein the balloon is no longer available to transport data through the balloon network when the balloon ceases to operate as a node in the balloon network.

20. The method of claim 19, wherein the balloon is configured to communicate with at least one other balloon in the balloon network after ceasing operation as a node in the balloon network, wherein the other balloon is operating as a node in the balloon network.

21. The method of claim 17, wherein an incentive to recover the balloon further comprises a receipt of a physical item.

22. The method of claim 17, wherein an incentive to recover the balloon further comprises an indication of a reward.

23. A non-transitory computer readable medium having stored therein instructions executable by a computing device to cause the computing device to perform functions, the functions comprising:

determining a landing location of a balloon, wherein the balloon is configured to operate as a node in a balloon network;

detecting a removal event of the balloon, wherein the removal event corresponds to the balloon ceasing to operate as a node in the balloon network and the balloon descending to the landing location; and initiating, in response to detecting the removal event, a transmission of a recovery-assistance signal, wherein the recovery-assistance signal comprises: (a) location data corresponding to the landing location of the balloon, and (b) an indication of an incentive to recover the balloon.

24. The non-transitory computer readable medium of claim 23, wherein the landing location is an expected landing location.

25. The non-transitory computer readable medium of claim 24, wherein the control system is further configured to determine the expected landing location in response to the removal event and transmit the recovery-assistance signal before the balloon lands.

\* \* \* \* \*